United States Patent
Ravenscroft et al.

(10) Patent No.: US 11,281,260 B2
(45) Date of Patent: Mar. 22, 2022

(54) DEVICE CAM-CONTROLLED ADJUSTMENT

(71) Applicant: Microsoft Technology Licensing, LLC, Redmond, WA (US)

(72) Inventors: Colin Michael Ravenscroft, Woodinville, WA (US); Kevin Chen, Seattle, WA (US); Jason Dale Brown, Sammamish, WA (US); Anthony George Picardo, Tacoma, WA (US); Anthony Ernest Hillyerd, Sammamish, WA (US); Brian David Bitz, Woodinville, WA (US); David Michael Lane, Sammamish, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 142 days.

(21) Appl. No.: 16/582,443

(22) Filed: Sep. 25, 2019

(65) Prior Publication Data

US 2021/0089091 A1 Mar. 25, 2021

(51) Int. Cl.
*G06F 1/16* (2006.01)
*E05D 7/04* (2006.01)
*E05D 3/02* (2006.01)

(52) U.S. Cl.
CPC ............ *G06F 1/1681* (2013.01); *E05D 3/02* (2013.01); *E05D 7/0415* (2013.01); *E05D 2007/0484* (2013.01); *E05Y 2600/12* (2013.01); *E05Y 2900/606* (2013.01); *G06F 1/1616* (2013.01)

(58) Field of Classification Search
CPC ................ E05D 2007/0484; E05D 7/0415
See application file for complete search history.

(56) References Cited

U.S. PATENT DOCUMENTS

| | | | | |
|---|---|---|---|---|
| 1,174,326 | A * | 3/1916 | Koliha | E05D 7/0415 16/242 |
| 6,739,019 | B2 * | 5/2004 | Schnelle | E05D 5/0276 16/235 |
| 7,017,231 | B2 * | 3/2006 | Isele | E05D 7/0407 16/242 |
| 7,509,708 | B1 * | 3/2009 | Radke | E05D 7/0415 16/237 |
| 7,516,516 | B2 * | 4/2009 | Wu | E05D 7/0415 16/238 |

(Continued)

FOREIGN PATENT DOCUMENTS

| | | |
|---|---|---|
| JP | 2017091150 A | 5/2017 |
| JP | 2018014074 A | 1/2018 |
| KR | 20120028679 A | 3/2012 |

OTHER PUBLICATIONS

"International Search Report and Written Opinion Issued in PCT Application No. PCT/US20/038572", dated Nov. 26, 2020, 18 Pages.

*Primary Examiner* — Jeffrey O'Brien
(74) *Attorney, Agent, or Firm* — Rainier Patents, P.S.

(57) ABSTRACT

The description relates to devices and device adjustment. One example can include a first portion that defines a cam pivot. The example can also include a height adjuster comprising a wedge and a positioning loop positioned over the cam pivot, such that rotation of a cam on the cam pivot to contact one cam follower of the positioning loop that moves the wedge toward another component or to contact an opposite cam follower of the positioning loop that moves the wedge away from the another component.

9 Claims, 9 Drawing Sheets

(56) References Cited

U.S. PATENT DOCUMENTS

| | | | | |
|---|---|---|---|---|
| 7,516,517 B2* | 4/2009 | Fries | .................... | E05D 7/02 |
| | | | | 16/246 |
| 7,571,516 B2* | 8/2009 | Lueffe | .................. | E05D 7/0423 |
| | | | | 16/235 |
| 7,614,116 B2* | 11/2009 | Chen | ........................ | E05D 7/04 |
| | | | | 16/238 |
| 8,720,008 B2* | 5/2014 | Dodge | ................. | E05D 7/0423 |
| | | | | 16/245 |
| 9,416,573 B2* | 8/2016 | Sabrowski | ............ | E05D 7/0415 |
| 9,874,049 B1* | 1/2018 | McGregor | ............ | E05D 7/0415 |
| 2002/0073509 A1* | 6/2002 | Dean | .................... | E05D 7/0415 |
| | | | | 16/387 |
| 2006/0137139 A1* | 6/2006 | Wu | ....................... | E05D 7/0415 |
| | | | | 16/236 |
| 2012/0167342 A1* | 7/2012 | Wu | ....................... | E05D 7/0415 |
| | | | | 16/239 |
| 2016/0153221 A1* | 6/2016 | Dodge | ................. | E05D 7/0415 |
| | | | | 16/238 |
| 2017/0146282 A1* | 5/2017 | Dodge | ................. | E05D 7/0415 |
| 2018/0073613 A1 | 3/2018 | Chen et al. | | |
| 2018/0166842 A1 | 6/2018 | Siddiqui | | |
| 2018/0196478 A1* | 7/2018 | Schafer | ................ | G06F 1/1616 |
| 2019/0390492 A1* | 12/2019 | Capur | ...................... | E05D 7/12 |

\* cited by examiner

DEVICE CAM-CONTROLLED ADJUSTMENT

BACKGROUND

The discussion relates to adjusting device components, such as device portions relative to one another. Traditionally, the components would be loosely secured before final positional adjustments were manually made. However, if the components were secured loose enough to allow adjustment, the components tend not to hold the adjusted position until they could be secured more robustly. The present concepts address these and other aspects.

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the FIG. and associated discussion where the reference number is first introduced.

DESCRIPTION

The present concepts relate to devices, and to adjusting structural relationships of device components. Structural relationship adjustment assemblies can be employed to accomplish the adjustment. The structural relationship adjustment assemblies can include a cam that interacts with a positioning loop to precisely and forcibly move one component relative to another.

Figure 1A:
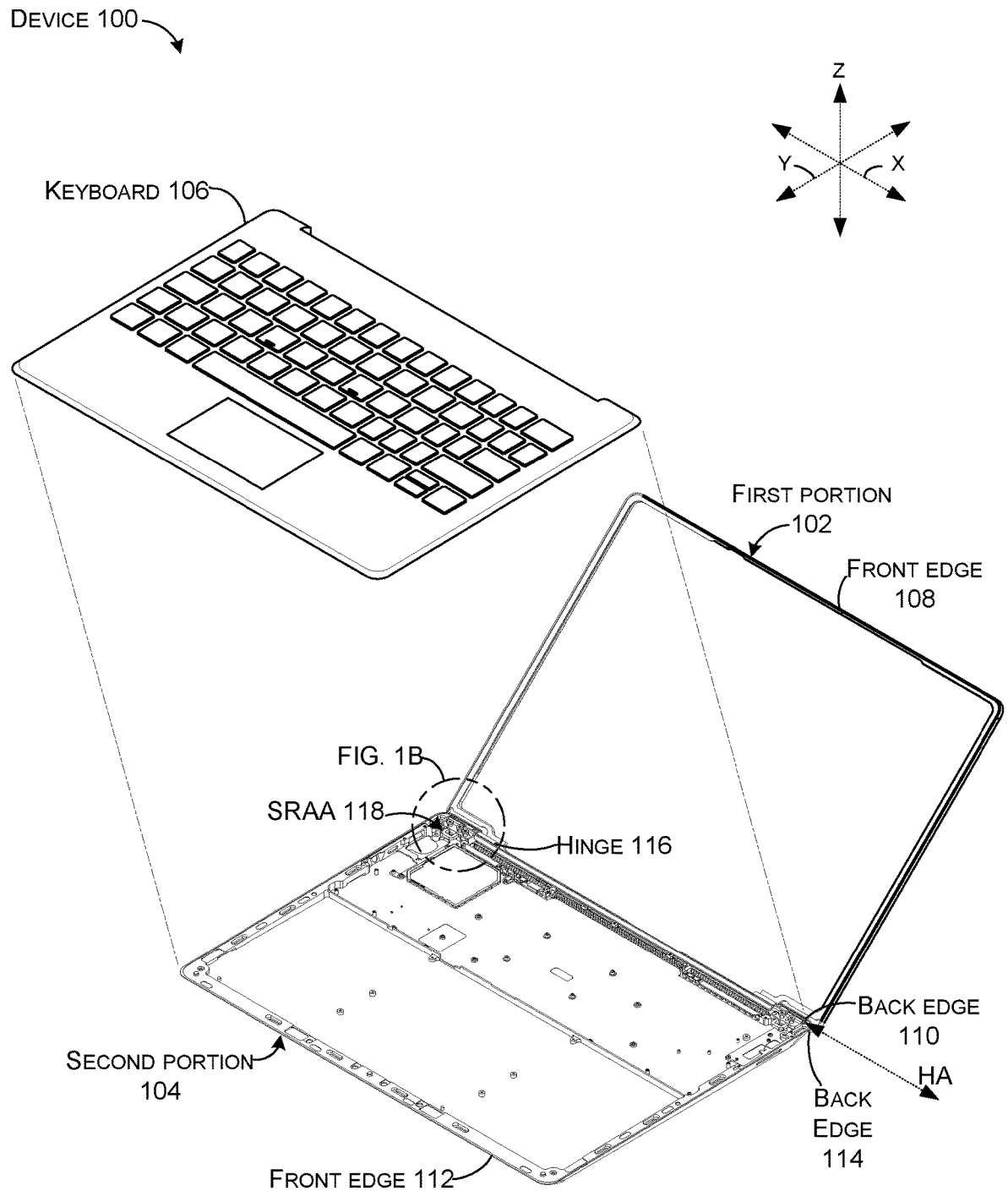
FIGS. 1A, 5A, and 7 are exploded perspective views of example devices that can employ cam-controlled adjustment implementations in accordance with the present concepts.
Figure 1B:
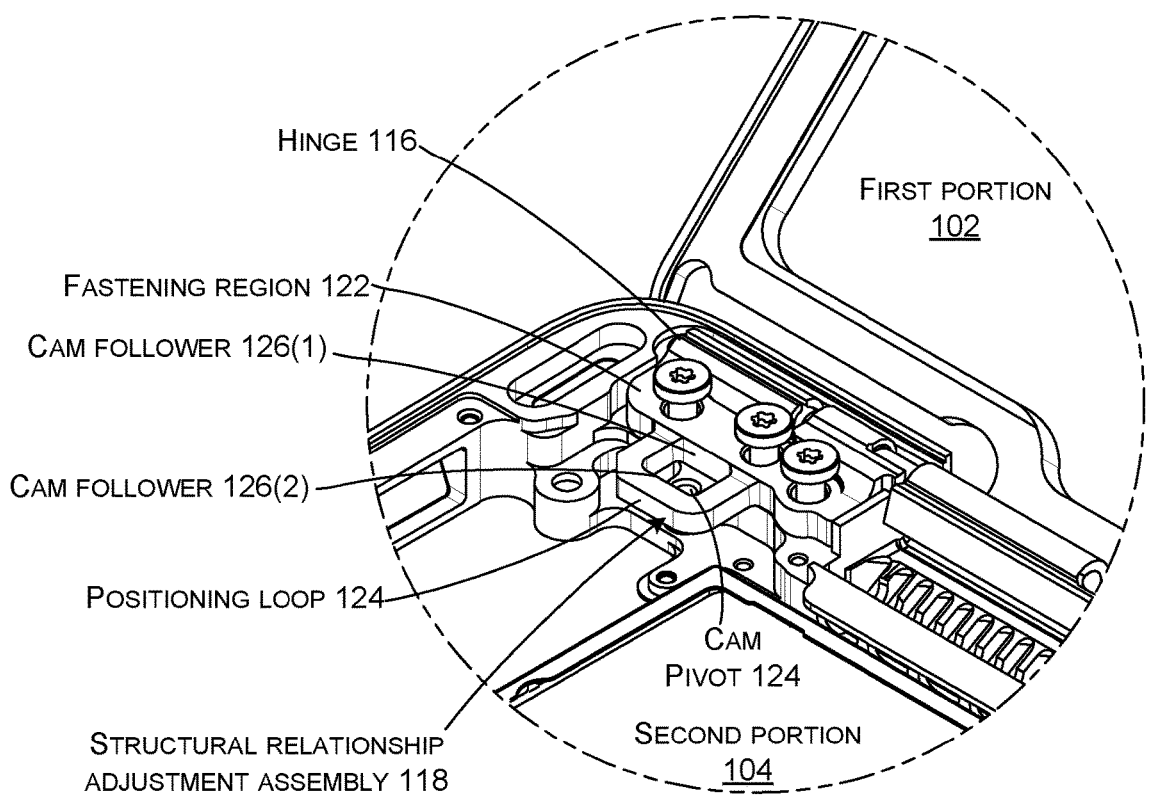
FIGS. 1B, 1C, 6A, 6B, and 6C are perspective views of example devices that can employ cam-controlled adjustment implementations in accordance with the present concepts.
Figure 1C:
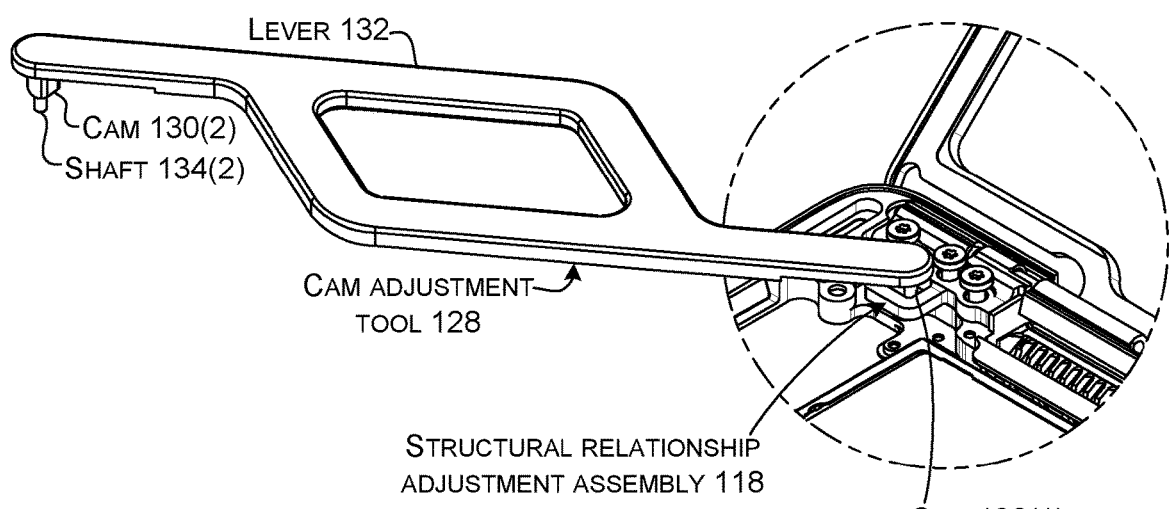

FIGS. 1A-1C collectively show some of the present cam-controlled adjustment concepts relative to an example device 100. In this example, device 100 is manifest as a notebook computer that includes a first portion 102 and a second portion 104. FIG. 1 shows an entirety of device 100 with a keyboard 106 removed from the second portion 104 to show the underlying components. FIGS. 1B and 1C show close-up views of the left side of device 100. The first portion 102 can define a front edge 108 and a back edge 110. Similarly, second portion 104 can define a front edge 112 and a back edge 114. The hinge 116 can rotationally secure the back edges 110 and 114 of the first and second portions along a hinge axis (HA) and/or multiple hinges axes. In this case, the hinge 116 can include, and/or be secured to a structural relationship adjustment assembly 118. The structural relationship adjustment assembly 118 can include a positioning loop 120 and a fastening region 122. The positioning loop 120 can be positioned over a cam pivot 124 defined by the second portion 104. The positioning loop 120 can define first and second opposing cam followers 126(1) and 126(2).

This implementation can also employ a cam adjustment tool 128, which can include a cam 130 secured to a lever 132. In this case the cam adjustment tool 128 includes cams 130(1) and 130(2) on opposing ends of the lever 132. The cams 130(1) and 130(2) can be slightly different sizes and or shapes (e.g., cam profiles). The cams 130 can be associated with shafts (illustrated relative to FIG. 5A) which can be engaged onto the cam pivot 124. Alternative implementations described below relative to FIGS. 5A-5D, 6A-6C, and 7 involve the cams 130 as an integral part of the structural relationship adjustment assembly 118 and the cams can be retained within the positioning loop 120.

Figure 2:
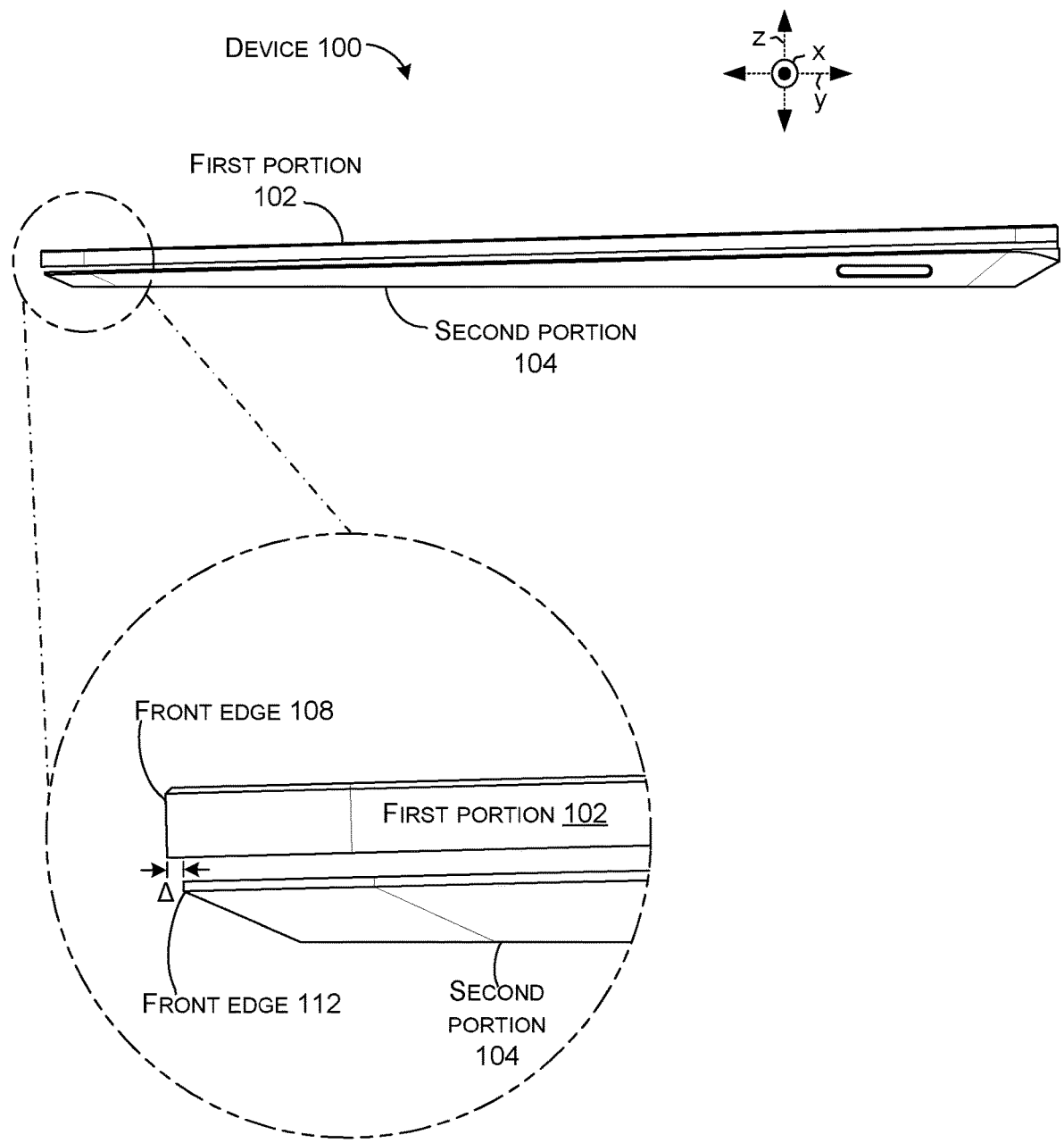
FIGS. 2, 3A, 3B, 4A-4C, and 5B-5D are elevational views of example devices that can employ cam-controlled adjustment implementations in accordance with the present concepts.
Figure 3A:
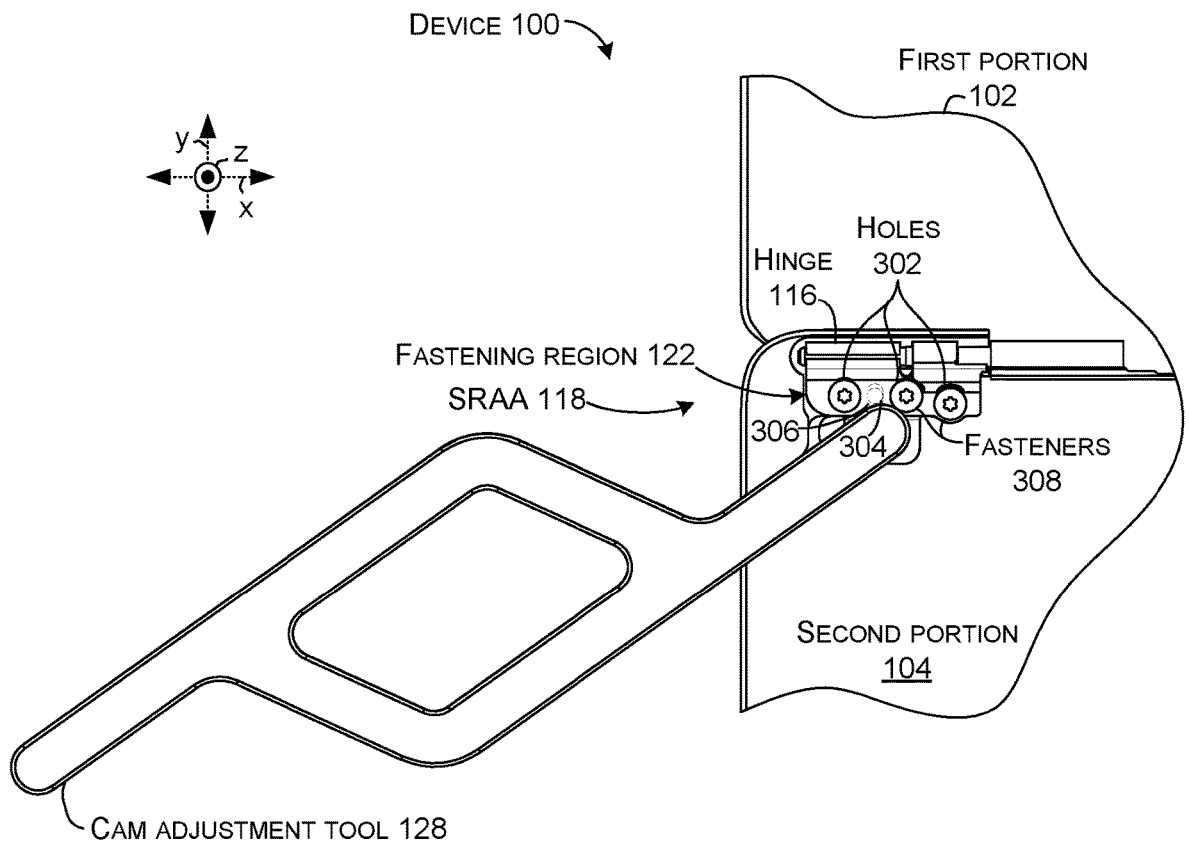
Figure 3B:
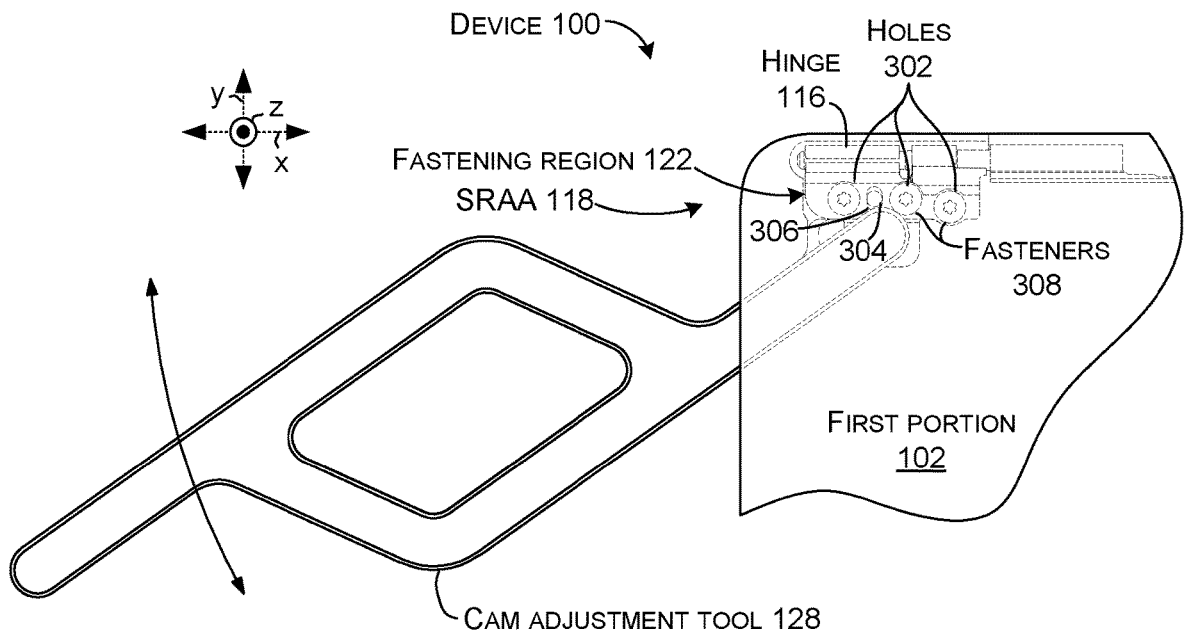

Functionality of the structural relationship adjustment assembly 118 is now explained relative to FIGS. 2 and 3A and 3B. In this case, the structural relationship adjustment assembly 118 can be used to control a relationship (e.g., delta or Δ) between the front edge 108 of the first portion 102 and the front edge 112 of the second portion 104. FIGS. 2 and 3B show the device 100 in a closed orientation where the first and second portions are rotated against one another. FIG. 3A shows the device in an open orientation with the first and second portions rotated away from one another.

FIGS. 3A and 3B show how the cam adjustment tool 128 can be used cooperatively with the structural relationship adjustment assembly 118 to adjust the delta between front edge 108 and front edge 112. FIG. 3A shows the cam adjustment tool 128 installed relative to the structural relationship adjustment assembly 118 while the first portion 102 and the second portion 104 are rotated away from one another (e.g., in an open configuration). FIG. 3B shows the first portion rotated until it contacts the second portion in a closed orientation.

In this case, the fastening region 122 includes three holes 302 and an alignment pin 304. The alignment pin 304 extends downwardly into an elongate slot 306 in the second portion 104. The alignment pin 304 and elongate slot 306 are shown in ghost to indicate that they would not be visible in this view. The shape of the elongate slot 306 can limit movement of the first and second portions 102 and 104 in the x-reference direction (e.g., an outside diameter of the pin can be approximately equal (or slightly smaller than) a width of the elongate slot measured in the x-reference direction). Conversely, the elongate slot is longer than the outside diameter of the alignment pin 304 to allow relative movement of the first and second portions in the y-reference direction. Stated another way, the alignment pin can move perpendicular to the hinge axis, but not parallel to the hinge axis. Fasteners 308 (only two of which are labeled to avoid clutter on the drawing page), such as threaded fasteners can extend through the holes 302 and be received in second portion 104. The holes 302 can be oversized (e.g., have an inside diameter that is greater than an outside diameter of the fasteners 308) to allow relative movement between the fastening region 122 (and hence the SRAA 118) and the second portion 104. The cam adjustment tool 128 can be rotated clockwise or counter-clockwise to cause this movement between the SRAA 118 and the second portion 104. In this case, the SRAA 118 is connected to the hinge 116 and the hinge is secured to the first portion 102. Thus, moving the SRAA 118 relative to the second portion moves the first portion 102 relative to the second portion 104.

Figure 4A:
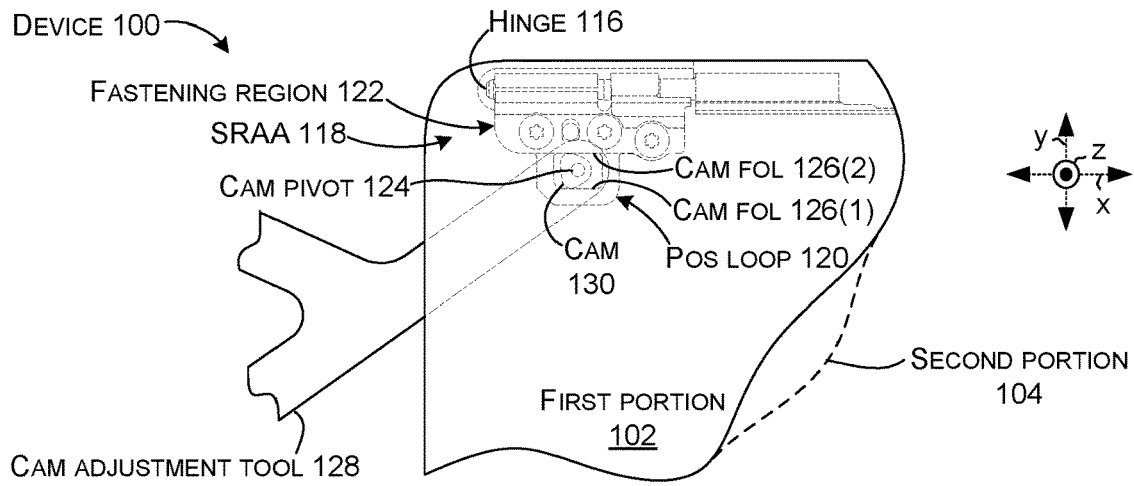
Figure 4B:
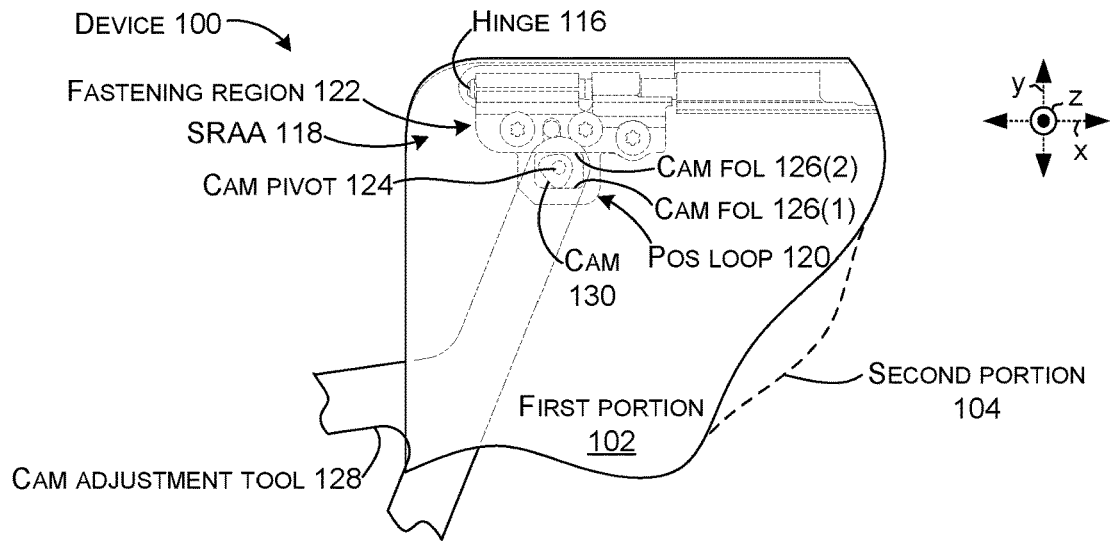
Figure 4C:
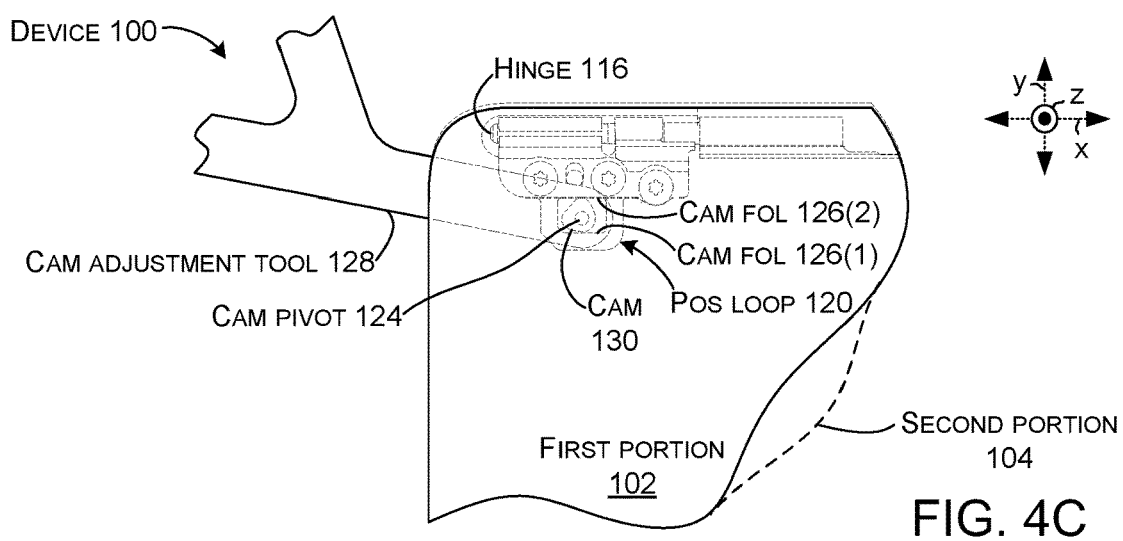

FIGS. 4A-4C collectively illustrate how the structural relationship adjustment assembly 118 can accomplish the y-reference axis movement between the first and second portions 102 and 104. Note that the first and second portions are in a closed orientation with the first portion 102 overlaying the second portion 104.

FIG. 4A shows the cam 130 in a neutral position that is not moving the first portion 102 and the second portion 104 relative to each other in the y-reference direction.

FIG. 4B shows the cam adjustment tool 128 rotated counter-clockwise to cause cam 130 to engage first cam follower 126(1). This contact imparts a force toward the bottom of the drawing page (e.g., in the –y-reference direction). The force can cause the positioning loop 120 and hence the SRAA 118, the hinge 116, and ultimately the first portion 102, to move downward (on the drawing page) relative to the second portion 104.

FIG. 4C shows the cam adjustment tool 128 rotated clockwise to cause cam 130 to engage second cam follower 126(2). This contact imparts a force toward the top of the drawing page (e.g., in the +y-reference direction). The force can cause the positioning loop 120 and hence the SRAA 118, the hinge 116, and ultimately the first portion 102, to move upward relative to the second portion 104.

The cam 130 can exert much greater forces between the first and second portions 102 and 104 than traditional manual techniques. Further, this high force can be delivered vary precisely to obtain the desired delta between the first and second portions as discussed relative to FIG. 2. This high force can allow the fasteners (308, FIGS. 3B and 3C) to be tightened sufficiently (prior to the adjustment) that the first and second device portions 102 and 104 will maintain their relative positions unless moved with the cam adjustment tool. Traditionally, the fasteners would have to be left very loose for manual adjustment, which allowed the first and second portions to inadvertently move before final tightening of the fasteners. Thus, the desired delta may not be achieved in the finished device. The described implementations solve these issues. Note that to avoid clutter on the drawing page, the SRAA 118 was explained relative to the left side of the device 100, the same concepts can be applied to the right side, either simultaneously or serially. Thus, the present implementations can provide very precise deltas to both the right and left sides with the fasteners providing high enough tension that deltas are maintained until final tightening of the fasteners.

Figure 5A:
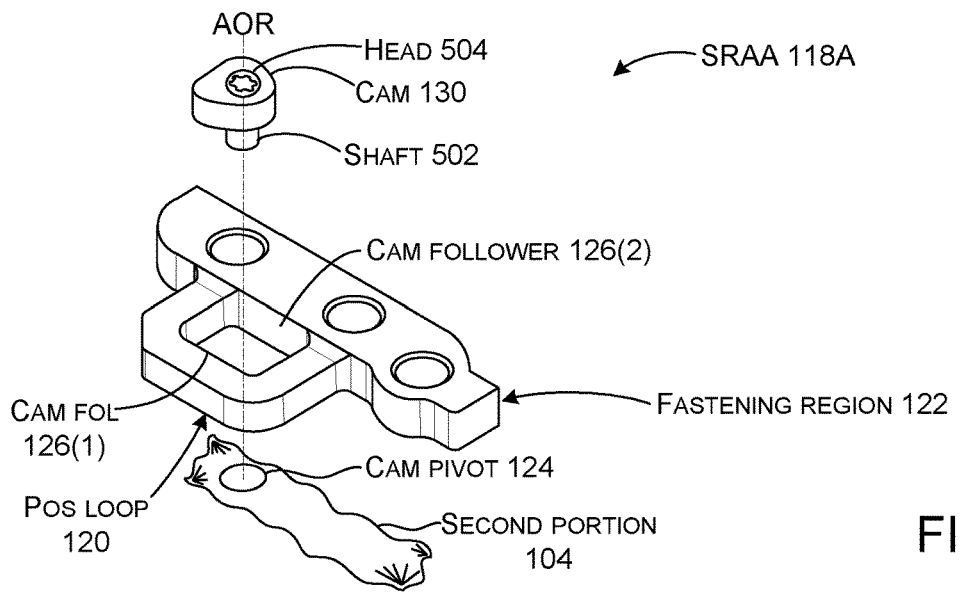
Figure 5B:
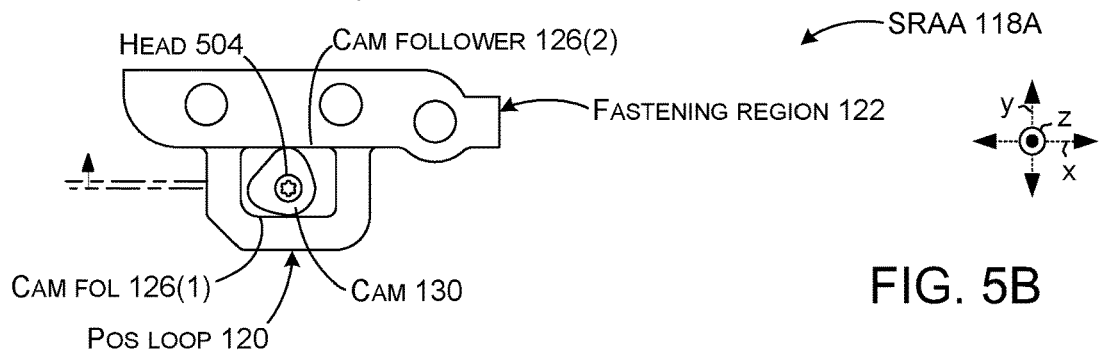
Figure 5C:
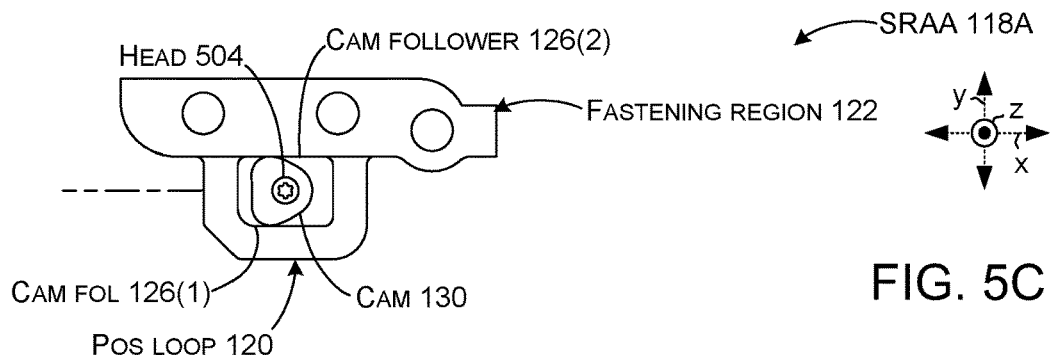
Figure 5D:
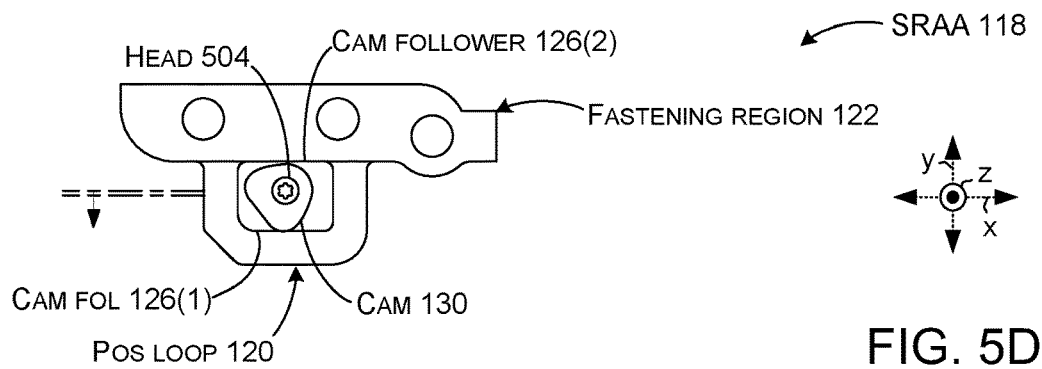

FIGS. 5A-5D collectively show an alternative example structural relationship adjustment assembly 118A. (The suffix 'A' indicates that some aspects of this structural relationship adjustment assembly 118A can be different from those of structural relationship adjustment assembly 118 described above relative to FIGS. 1A-4C. Elements introduced above relative to FIGS. 1A-4C are not re-introduced here for sake of brevity). FIG. 5A shows an exploded perspective view of the cam 130 positioned over the positioning loop 120, which in turn is positioned over a small region of the second portion 104, that includes the cam pivot 124. FIGS. 5B-5D are elevational views of the structural relationship adjustment assembly 118 with the cam 130 rotated to different orientations.

The structural relationship adjustment assembly 118 can be used to precisely and with high force levels, move the first and second portions 102 and 104 relative to one another. That aspect was discussed above relative to FIGS. 1A-4C and as such is not revisited in detail here.

In this implementation a shaft 502 is visible extending downwardly from cam 130. The shaft 502 is received in cam pivot 124 to define an axis of rotation (AOR) of the cam 130. In this case, cam 130 can define a driver head 504, such as a star head, square head, or Phillips head, among others. A corresponding driver (shown in FIG. 7), such as a star head driver can be employed to rotate the cam 130. Thus, the driver head 504 on the cam 130 can facilitate user adjustment of the cam.

In this implementation, the structural relationship adjustment assembly 118A, including the cam 130 can be retained in the device after assembly. Subsequent adjustments can be made by any user possessing the corresponding driver.

As mentioned, a user can utilize a corresponding driver (e.g., a star head driver) to rotate the cam 130 to change the position of the structural relationship adjustment assembly 118A relative to the second portion 104. For instance, FIG. 5B shows the cam 130 rotated to impart a force on cam follower 126(2). The force can move the structural relationship adjustment assembly 118A upward on the drawing page relative to the second portion 104 (e.g., in the +y-reference direction).

FIG. 5C shows the cam 130 rotated to a neutral position that does not impart forces on the positioning loop 120 in either direction. FIG. 5D shows the cam 130 rotated to impart a force on cam follower 126(1). The force can move the structural relationship adjustment assembly 118A downward on the drawing page relative to the second portion 104 (e.g., in the –y-reference direction).

Figure 6A:
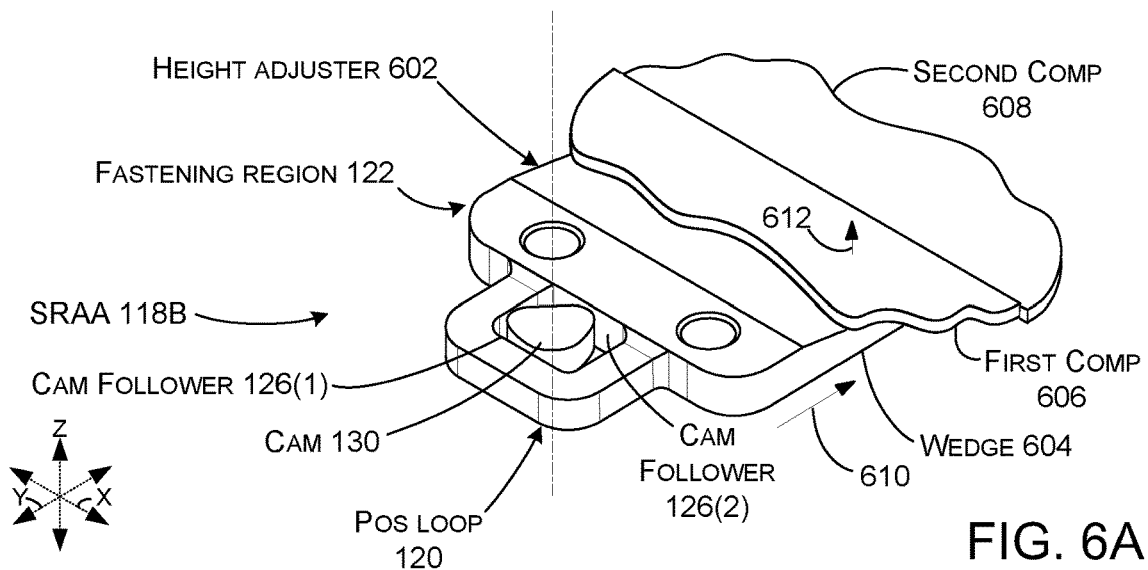
Figure 6B:
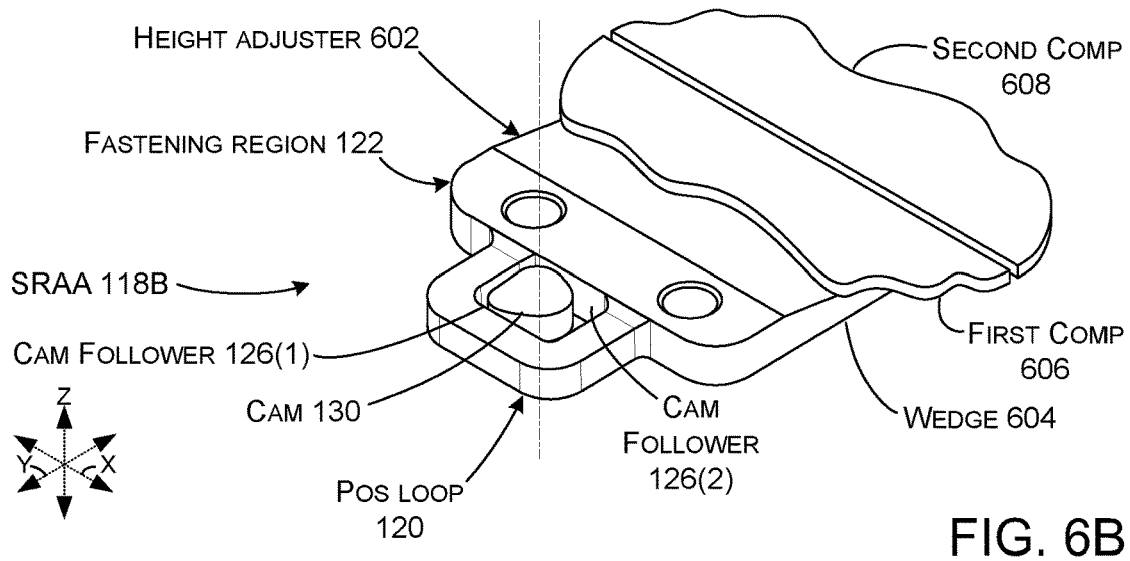
Figure 6C:
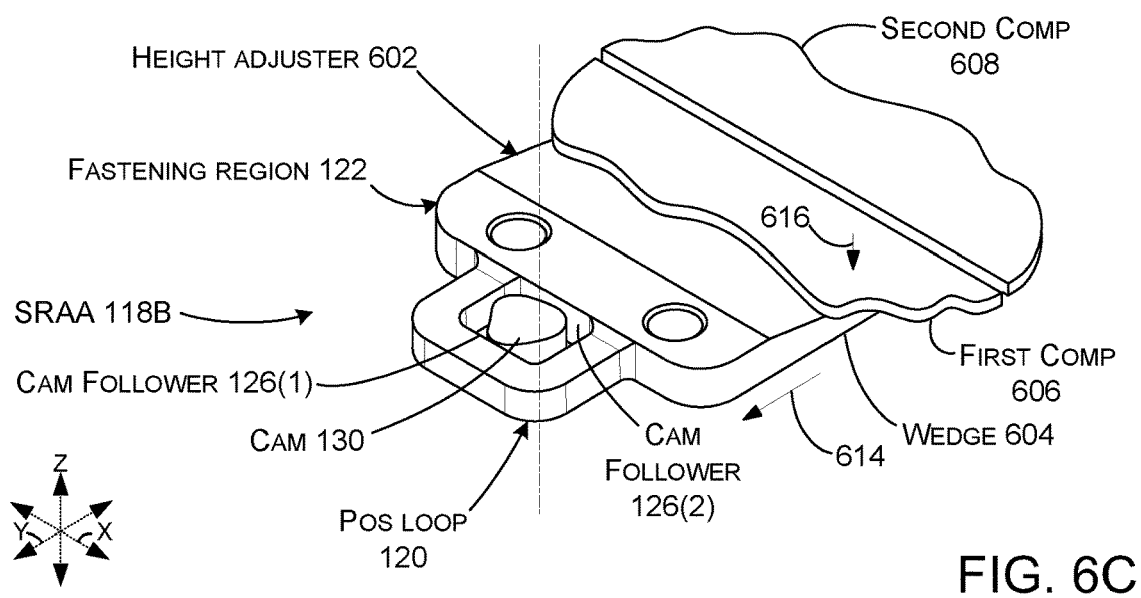

FIGS. 6A-6C collectively show an alternative example structural relationship adjustment assembly 118B. (The suffix 'B' indicates that some aspects of this structural relationship adjustment assembly can be different from those of structural relationship adjustment assemblies 118 and 118A described above. Elements introduced above relative to FIGS. 1A-5D are not re-introduced here for sake of brevity).

In this implementation, structural relationship adjustment assembly 118B includes a height adjuster 602 in the form of a wedge 604. In this case, the cam 130 can be used to move the wedge 604 to adjust a height of a first component 606 relative to a second component 608.

As shown in FIG. 6A, cam 130 can be rotated against cam follower 126(2) to move wedge 604 toward the first component 606 as indicated by arrow 610. This movement can lift the first component 606 relative to the second component 608 as indicated by arrow 612.

FIG. 6B shows cam 130 rotated to an orientation where it is not acting on the positioning loop 120 and the first and second components 606 and 608 are at approximately equal heights. FIG. 6C shows cam 130 rotated against cam follower 126(1) to move wedge 604 away from the first component 606 as indicated by arrow 614. This movement can allow the first component 606 to drop relative to the second component 608 as indicated by arrow 616. Once a desired height relationship is established between the two components, the fasteners described above relative to FIGS. 1-4C can be tightened to maintain the desired height relationship.

This implementation of the structural relationship adjustment assembly 118B can be employed to allow relative adjustment of many different components of a device. For instance, the first and second components could be a bezel and a display. In another example, the first and second components could be a housing and a touch pad. The structural relationship adjustment assembly 118B can allow a desired height relationship to be established and maintained between the two components. Other pairs of components are also contemplated.

Figure 7:
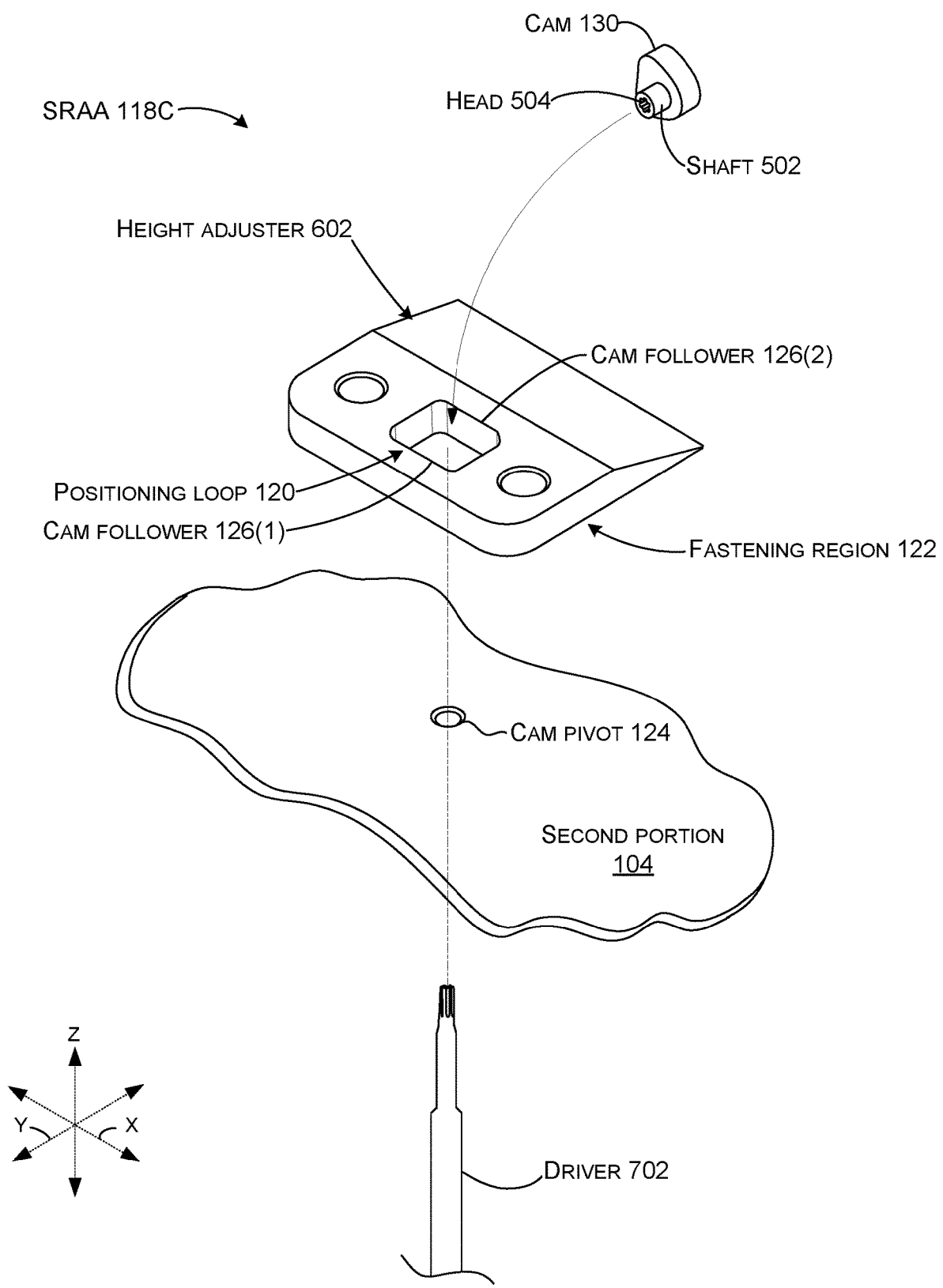

FIG. 7 shows an alternative example structural relationship adjustment assembly 118C. (The suffix 'C' indicates that some aspects of this structural relationship adjustment assembly can be different from those of structural relationship adjustment assemblies 118, 118A, and/or 118B, described above. Elements introduced above are not re-introduced here for sake of brevity).

In this implementation, the positioning loop 120 is positioned within the fastening region 122. In still another implementation, the positioning loop 120 could be located between the fastening region 122 and the height adjuster 602.

In this case, the head 504 is positioned on the shaft 502. In this configuration, with the shaft 502 received in the cam pivot (e.g., defined by the cam pivot) 124, the user could access the head 504 with a corresponding driver 702 through the second portion 104. This configuration can allow the user to rotate the cam 130 without concern for intervening components, such as the keyboard 106 of FIG. 1A.

The described structural relationship adjustment assemblies can allow precise alignment of device structures, such as the first and second portions and/or other components. The structural relationship adjustment assemblies can allow manufacturing tolerances of component dimensions to be adjusted to conform to specified tolerances. The structural relationship adjustment assemblies can provide very high forces so that fasteners can be secured tight enough that the adjusted components maintain their adjusted relationship until they can be tightened/torqued to final specifications. This high force is combined with extreme precision offered by the camming action of the structural relationship adjustment assemblies.

Figure 8:
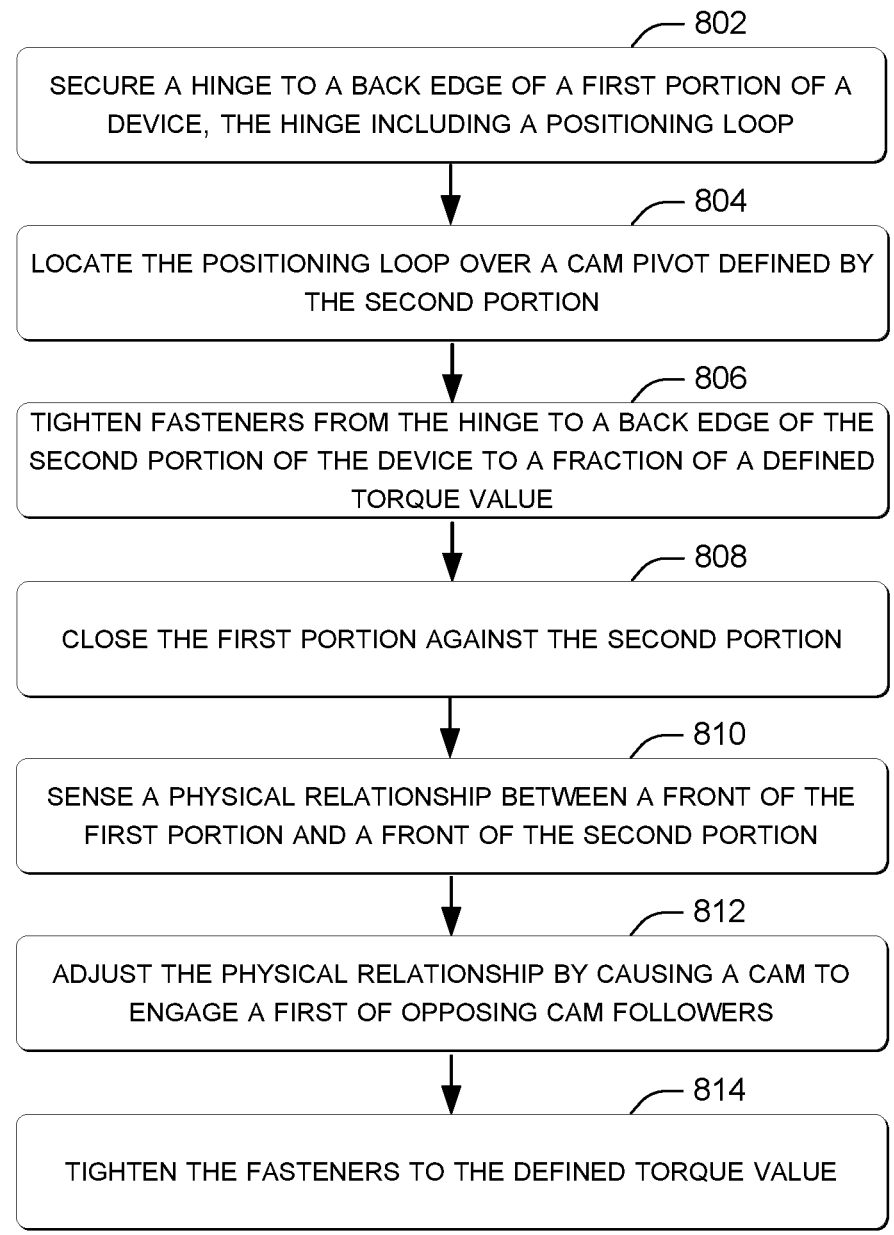
FIG. 8 is a flowchart of an example cam-controlled adjustment method in accordance with the present concepts.

FIG. 8 shows a flowchart of a device assembly (and/or re-assembly) technique or method 800.

At block 802, the method can secure a hinge to a back edge of a first portion of a device. The hinge can include a positioning loop. In some cases, the hinge can be fixedly secured to the first portion so that the hinge does not move relative to the first portion.

At block 804, the method can locate the positioning loop over a cam pivot defined by the second portion.

At block 806, the method can tighten fasteners from the hinge to a back edge of the second portion of the device to a fraction of a defined torque value. For instance, for purposes of explanation, the fraction could be in a range from about 50% to about 80% of the defined torque value. In some cases, at this point the hinge can be fixedly secured to the first portion and secured well enough to the second portion that the hinge does not move relative to the second portion when the first and second portions are rotated around the hinge axis.

At block 808, the method can close the first portion against the second portion. Stated another way, the first and second portions can be rotated around the hinge axis or axes until touching one another.

At block 810, the method can sense a physical relationship between a front of the first portion and a front of the second portion.

At block 812, the method can adjust the physical relationship by causing a cam to engage a first of opposing cam followers defined by the positioning loop to move the first portion forward relative to the second portion or to engage a second of the opposing cam followers defined by the positioning loop to move the first portion backward relative to the second portion. In some implementations, this cam adjustment can be performed on multiple locations on the device, such as the left and right sides. In the case of multiple locations, the cam adjustments can be performed serially or simultaneously to one another (e.g., left side first and then right side of both left and right sides at the same time).

At block 814, the method can tighten the fasteners to the defined torque value.

The present concepts can be utilized with various types of devices, such as computing devices that can include, but are not limited to, notebook computers, tablet type computers, smart phones, wearable smart devices, gaming devices, entertainment consoles, and/or other developing or yet to be developed types of devices. As used herein, a computing device can be any type of device that has some amount of processing and/or storage capacity and/or other heat generating components. A mobile computing device can be any computing device that is intended to be readily transported by a user.

Various examples are described above. Additional examples are described below. One example includes a device including a first portion and a second portion that defines a cam pivot and a hinge fixedly secured to the first portion and comprising a positioning loop positioned over the cam pivot and defining first and second opposing cam followers positioned on opposite sides of the cam pivot.

Another example can include any of the above and/or below examples where the hinge defines a hinge axis that extends between the first and second portions, and wherein the positioning loop extends away from the hinge axis.

Another example can include any of the above and/or below examples where the device further comprises a cam positioned over the cam pivot.

Another example can include any of the above and/or below examples where rotation of the cam on the cam pivot in a first direction causes the cam to engage the first cam follower and move the first portion in a first direction relative to the second portion and rotation of the cam on the cam pivot in a second direction causes the cam to engage the second cam follower and move the first portion in a second opposite direction relative to the second portion.

Another example can include any of the above and/or below examples where the device further comprises a fastening region for securing the hinge to the second portion.

Another example can include any of the above and/or below examples where the fastening region is between the hinge and the positioning loop, or wherein the fastening region is on an opposite side of the positioning loop as the hinge, or wherein the positioning loop is defined in the fastening region.

Another example can include any of the above and/or below examples where the fastening region comprises an alignment pin that engages a slot in the second portion to limit relative movement of the first and second portions parallel to a hinge axis defined by the hinge.

Another example can include any of the above and/or below examples where the fastening region defines multiple holes receiving multiple fasteners that extend into the second portion and wherein the multiple holes are oversized relative to a diameter of the multiple fasteners to allow movement of the hinge relative to the second portion.

Another example includes a device comprising a first portion that defines a cam pivot and a height adjuster comprising a wedge and a positioning loop positioned over the cam pivot, such that rotation of a cam on the cam pivot to contact one cam follower of the positioning loop that moves the wedge toward a component or to contact an opposite cam follower of the positioning loop that moves the wedge away from the component.

Another example can include any of the above and/or below examples where the cam includes a driver head to facilitate rotation of the cam by a corresponding driver.

Another example can include any of the above and/or below examples where the driver head includes a star driver head or a Phillips driver head.

Another example can include any of the above and/or below examples where the cam includes a shaft that is received in the cam pivot.

Another example can include any of the above and/or below examples where the driver head is defined in the shaft.

Another example can include any of the above and/or below examples where the driver head is accessed through the cam pivot.

Another example can include any of the above and/or below examples where the driver head is defined in a top of the cam opposite the shaft.

Another example can include any of the above and/or below examples where the device further comprises a fastening region configured to secure the wedge and a positioning loop to the first portion.

Another example can include any of the above and/or below examples where the fastening region is located between the wedge and the positioning loop, or wherein the fastening region defines the positioning loop.

Another example includes a method comprising securing a hinge to a back edge of a first portion of a device. The hinge can include a positioning loop, The method can involve locating the positioning loop over a cam pivot defined by a second portion of the device, tightening fasteners from the hinge to a back edge of the second portion of the device to a fraction of a defined torque value, and closing the first portion against the second portion. The method also comprises sensing a physical relationship between a front edge of the first portion and a front edge of the second portion, adjusting the physical relationship by causing a cam to engage a first of opposing cam followers defined by the positioning loop to move the first portion forward relative to the second portion or to engage a second of the opposing cam followers defined by the positioning loop to move the first portion backward relative to the second portion, and tightening the fasteners to the defined torque value.

Another example can include any of the above and/or below examples where the causing the cam to engage a first of opposing cam followers comprises rotating the cam clockwise.

Another example can include any of the above and/or below examples where the tightening the fasteners comprises rotating the first portion into an open orientation to access the fasteners.

CONCLUSION

Although techniques, methods, devices, systems, etc., pertaining to structural relationship adjustment assemblies are described in language specific to structural features and/or methodological acts, it is to be understood that the subject matter defined in the appended claims is not necessarily limited to the specific features or acts described. Rather, the specific features and acts are disclosed as example forms of implementing the claimed methods, devices, systems, etc.

The invention claimed is:

1. A device, comprising:
a first portion and a second portion that defines a cam pivot within the second portion; and,
a hinge fixedly secured to the first portion and comprising a positioning loop positioned over the cam pivot and defining first and second opposing cam followers positioned on opposite sides of the cam pivot, and
the positioning loop is configured to be engaged by a cam of a cam adjustment tool that is configured to be sandwiched between the first and second portions to extend through the positioning loop and into the cam pivot when the first and second portions are closed against one another and configured so that rotation of the cam adjustment tool causes the cam to engage one of the first and second opposing cam followers to create a force between the hinge and the second portion to move the hinge relative to the second portion when the first and second portions are closed against one another.

2. The device of claim 1, wherein the hinge defines a hinge axis that extends between the first and second portions, and wherein the positioning loop extends away from the hinge axis.

3. The device of claim 2, wherein the cam is positioned over and in line with the cam pivot.

4. The device of claim 3, wherein rotation of the cam on the cam pivot in a first direction causes the cam to engage the first cam follower and move the first portion and the hinge in a first direction relative to the second portion and rotation of the cam on the cam pivot in a second direction causes the cam to engage the second cam follower and move the first portion and the hinge in a second opposite direction relative to the second portion.

5. The device of claim 1, wherein the hinge defines a hinge axis around which the first and second portions are configured to rotate and further comprises a fastening region configured to secure the hinge to the second portion.

6. The device of claim 5, wherein the fastening region is between the hinge axis and the positioning loop, or wherein the fastening region is on an opposite side of the positioning loop as the hinge axis, or wherein the positioning loop is defined in the fastening region.

7. The device of claim 6, wherein the fastening region comprises an alignment pin that engages a slot in the second portion to limit relative movement of the first and second portions parallel to the hinge axis defined by the hinge.

8. The device of claim 7, wherein the fastening region defines multiple holes receiving multiple fasteners that extend into the second portion and wherein the multiple holes are oversized relative to a diameter of the multiple fasteners to allow movement of the hinge relative to the second portion.

9. A device, comprising:
a first portion;
a second portion that defines a cam pivot within the second portion that is configured to receive a cam adjustment tool configured to be rotated around the cam pivot; and,
a hinge fixedly secured to the first portion and comprising a fastening region proximate to a hinge axis defined by the hinge and a positioning loop distal to the hinge axis, the fastening region secured to the second portion with multiple fasteners, the positioning loop positioned over the cam pivot and defining a pair of opposing cam surfaces that are configured to be engaged by a cam of the cam adjustment tool that is sandwiched between the first and second portions to move the hinge relative to the second portion when the first and second portions are closed against one another.

* * * * *